United States Patent
Ishigure et al.

(10) Patent No.: US 9,997,310 B2
(45) Date of Patent: Jun. 12, 2018

(54) SWITCH DEVICE

(71) Applicant: KABUSHIKI KAISHA TOKAI RIKA DENKI SEISAKUSHO, Aichi (JP)

(72) Inventors: Nobuyuki Ishigure, Aichi (JP); Yoshio Chiba, Aichi (JP); Akio Nishiyama, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days. days.

(21) Appl. No.: 15/053,062

(22) Filed: Feb. 25, 2016

(65) Prior Publication Data
US 2016/0247645 A1  Aug. 25, 2016

(30) Foreign Application Priority Data

Feb. 25, 2015  (JP) ................. 2015-035193

(51) Int. Cl.
  *H01H 9/00*  (2006.01)
  *H01H 19/14*  (2006.01)
  (Continued)

(52) U.S. Cl.
  CPC ........... *H01H 19/14* (2013.01); *B60Q 1/1476* (2013.01); *H01H 11/00* (2013.01); *H01H 19/56* (2013.01);
  (Continued)

(58) Field of Classification Search
  CPC ........ H01H 19/14; H01H 11/00; H01H 25/04; H01H 19/56; H01H 2235/01
  (Continued)

(56) References Cited

U.S. PATENT DOCUMENTS 5,780,794 A * 7/1998 Uchiyama ............ B60Q 1/1476
                                                                    200/5 R
6,091,033 A    7/2000 Kato
(Continued)

FOREIGN PATENT DOCUMENTS

DE        19722780 C1     11/1998
JP       H09-198968 A      7/1997
(Continued)

OTHER PUBLICATIONS

Japanese Office Action 2015-035193 dated Jan. 24, 2017 and partial English translation thereof.
(Continued)

*Primary Examiner* — Edwin A. Leon
*Assistant Examiner* — Lheiren Mae A Caroc
(74) *Attorney, Agent, or Firm* — Thomas W. Cole; Roberts Mlotkowski Safran Cole & Calderon P.C.

(57) ABSTRACT

A subassembly includes an intermediate knob serving as a first knob rotatably fitted to and supported by a middle serving as a fixing portion, a first spring and a first ball for giving a detent feeling upon a rotary movement between the middle serving as the fixing portion and the intermediate knob, a distal end knob serving as a second knob rotatably fitted to and supported by the middle serving as the fixing portion, and a second spring and a second ball for giving a detent feeling upon a rotary movement between the middle serving as the fixing portion and the distal end knob. In such a subassembly, the intermediate knob, the first spring and the first ball, and the distal end knob, the second spring and the second ball are integrally assembled as a subassembly.

7 Claims, 4 Drawing Sheets

(51) Int. Cl.
*H01H 19/56* (2006.01)
*B60Q 1/14* (2006.01)
*H01H 11/00* (2006.01)
*H01H 25/04* (2006.01)

(52) U.S. Cl.
CPC ......... *H01H 25/04* (2013.01); *H01H 2235/01* (2013.01)

(58) Field of Classification Search
USPC .............................. 200/61.27–61.39, 61.54
See application file for complete search history.

(56) References Cited

U.S. PATENT DOCUMENTS

2003/0102202 A1* 6/2003 Naito .................. B60Q 1/1476
200/61.54
2015/0068876 A1* 3/2015 Urakami .............. B60Q 1/1476
200/7

FOREIGN PATENT DOCUMENTS

JP 2000-348575 A 12/2000
JP 2003-157746 A 5/2003
WO 1997020335 A1 11/1996

OTHER PUBLICATIONS

Extended European Search Report for corresponding application No. 16157156.7-1808 dated Jul. 19, 2016.
Chinese Patent Application No. 201610099009.1 Office Action, dated Jun. 28 2017, and English translation thereof.
Office Action issued in the corresponding Japanese Patent Application No. 2015-035193 dated Sep. 5, 2017.
Office Action issued in the corresponding Chinese Patent Application No. 201610099009.1 dated Jan. 2, 2018.
Office Action issued in the corresponding Chinese Patent Application No. 201610099009.1 dated Apr. 17, 2018.

* cited by examiner

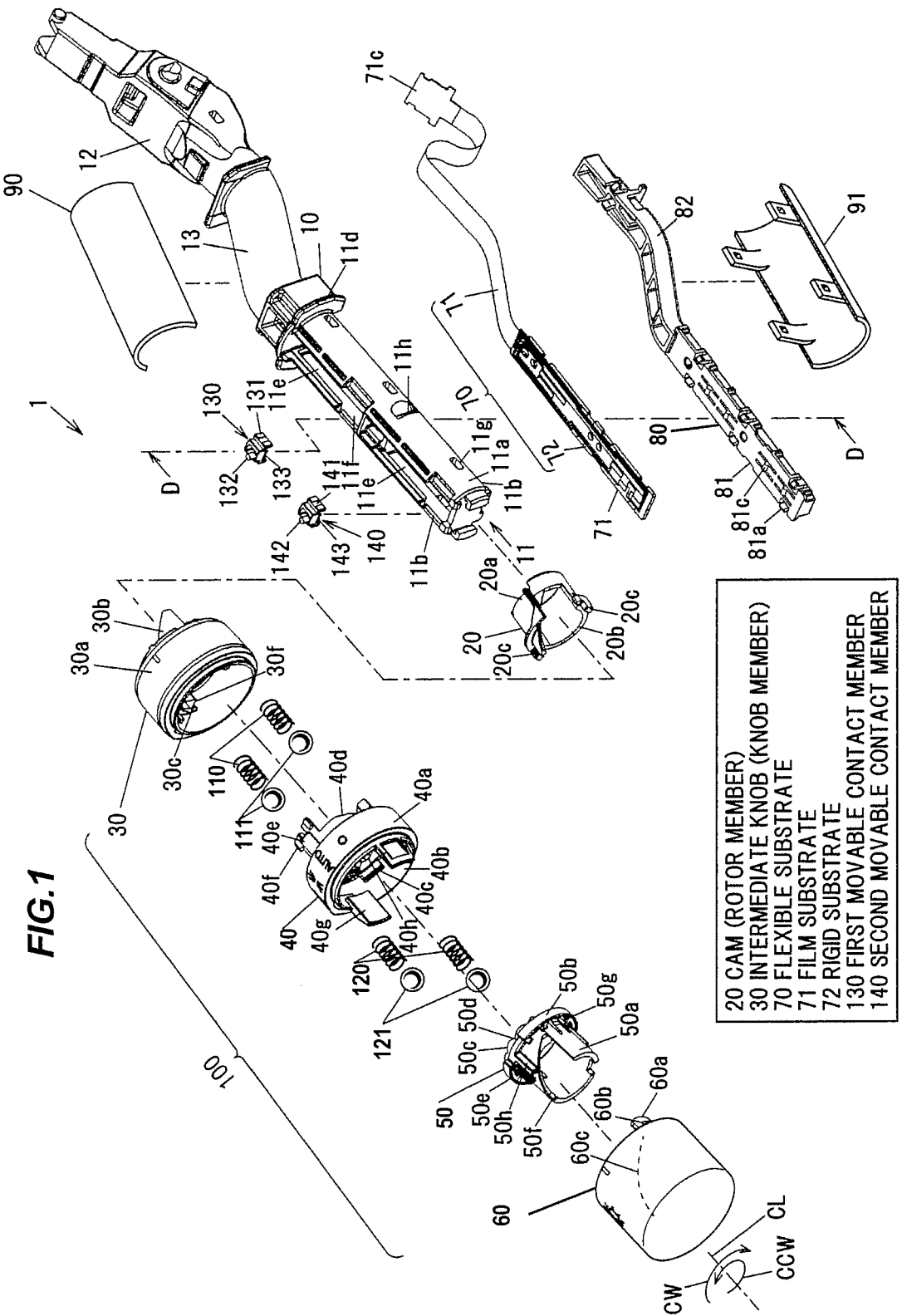

SWITCH DEVICE

The present application is based on Japanese patent application No. 2015-035193 filed on Feb. 25, 2015, the entire contents of which are incorporated herein by reference.

BACKGROUND OF THE INVENTION

1. Field of the Invention

The present invention relates to a switch device.

2. Description of the Related Art

Conventional switch devices include a composite switch device for an automobile provided to a steering column of a vehicle. In such a device, a rotary light switch knob driven to switch a light switch, and a rotary fog switch knob driven to turn on a fog light switch are rotatably supported on a lever shaft and an outer cylindrical shaft, respectively (Patent Document 1, for example).

According to the switch device of Patent Document 1, when the fog switch knob is assembled with a fixing knob, a coil spring that has been loaded protruding from the end surface of the fog switch knob resiliently presses against a click locking ball toward a detent locking structure that is formed in the fixing knob by sawtooth detent peaks being arranged in a circular-arc shape. Furthermore, when the light switch knob is assembled with a fixing knob, a coil spring that has been loaded protruding from the end surface of the fixing knob resiliently presses against a click locking ball toward a detent locking structure that is formed in the light switch knob by sawtooth detent peaks being arranged in a circular-arc shape.

CITATION LIST

Patent Literature

Japanese Unexamined Patent Application Publication No. H09-198968A

SUMMARY OF THE INVENTION

In the switch device of Patent Document 1, locations that allow subassembly of components that retain a detent ball and a spring are limited, and a jig for applying detent grease may be required on both a subassembly line and a manufacturing line, resulting in problems of inefficiency.

An object of the present invention is to provide a switch device having a configuration in which grease can be collectively applied to detent parts, and detent components, such as a knob member, a detent ball, and a spring, are subassembled.

[1] According to an embodiment of the invention, provided is a switch device including a first knob rotatably fitted to and supported by a fixing portion, a first spring and a first ball for giving a detent feeling upon a rotary movement between the fixing portion and the first knob, a second knob rotatably fitted to and supported by the fixing portion, and a second spring and a second ball for giving a detent feeling upon a rotary movement between the fixing portion and the second knob. In such a switch device, the first knob, the first spring and the first ball, and the second knob, the second spring and the second ball are integrally assembled as a subassembly.

[2] The switch device may be the device described in [1] above, wherein the subassembly is assembled into the switch device in a temporarily assembled state.

[3] Further, the switch device may be the device described in [1] or [2] above, wherein grease is collectively applied to locations that come into contact with the first ball and the second ball, and subassembly is performed.

[4] Further, the switch device may be the device described in any one of [1] to [3] above, wherein the first knob and the second knob face each other across the fixing portion.

[5] Further, the switch device may be the device described in any one of [1] to [3] above, wherein the fixing portion comprises engaging portions with the first knob and the second knob, respectively.

Advantageous Effects of Invention

According to an embodiment of the present invention, it is possible to provide a switch device that has a configuration in which grease can be collectively applied to detent parts, and detent components, such as a knob member, a detent ball, and a spring, are subassembled.

BRIEF DESCRIPTION OF THE DRAWINGS

FIG. 1 is an exploded perspective view illustrating an overall configuration of a switch device according to an embodiment of the present invention.

DETAILED DESCRIPTION OF THE PREFERRED EMBODIMENTS

Embodiment(s) of Present Invention

Configuration of Switch Device 1

Figure 2A:
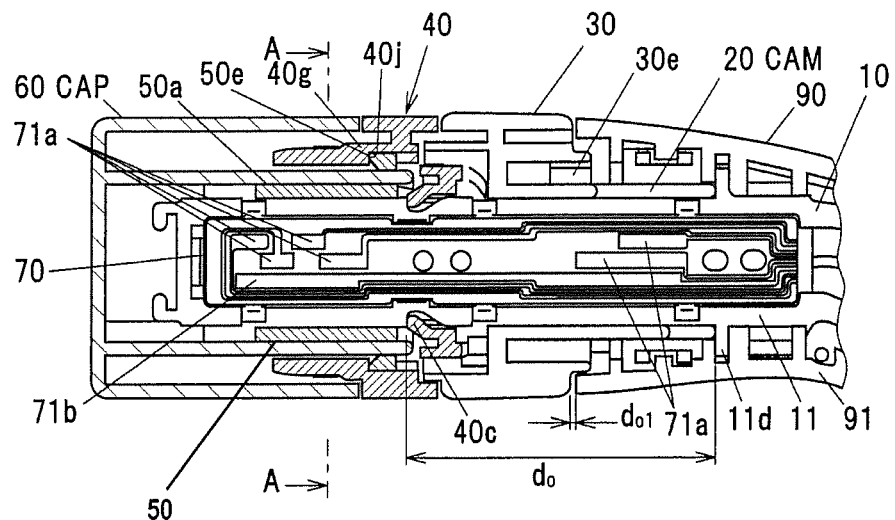
FIG. 2A is a longitudinal cross-sectional view that includes a longitudinal axis CL of the switch device according to the embodiment of the present invention.

FIG. 1 is an exploded perspective view illustrating an overall configuration of a switch device according to an embodiment of the present invention. This switch device 1 is mounted to a steering column of a vehicle and is for operating in-vehicle turn signal lamps, headlamps, and fog lamps. The switch device 1 is configured as follows. This switch device is described in the following as a device applied to a turn lever device of a vehicle, and as a configuration for a left-hand drive vehicle. The switch device 1 configured as illustrated in FIG. 1 is mounted to the steering column, and is pivotable between a neutral position and a right-turn position on an upper side from the neutral position, and between the neutral position and a left-turn position on a lower side from the neutral position. Further, the switch device 1 is capable of performing control such as turning on the lights on the basis of a rotational operation of a cap 60, and turning on the fog lights on the basis of a rotational operation of an intermediate knob 30.

The switch device 1 according to the embodiment of the present invention includes: rotor members (cam 20, cap 60) mounted so as to be rotatable about a longitudinal axis CL of a lever main body 10, the rotor members (cam 20, cap 60) including cam surfaces; knob members (intermediate knob 30, distal end knob 50) mounted so as to be integrally rotatable with the rotor members (cam 20, cap 60), the knob members (intermediate knob 30, distal end knob 50) including cam surfaces that face the cam surfaces of the rotor members (cam 20, cap 60) with a gap therebetween; movable contact members (first movable contact member 130, second movable contact member 140) disposed in the gap between the cam surfaces of the rotor members (cam 20, cap 60) and the cam surfaces of the knob members (intermediate knob 30, distal end knob 50), the movable contact members (first movable contact member 130, second movable contact member 140) being movable in the longitudinal axis CL direction by a rotational operation of the rotor members (cam 20, cap 60) and the knob members (intermediate knob 30, distal end knob 50) about the longitudinal axis CL; and a flexible substrate 70 linearly disposed in the longitudinal axis CL direction in at least a movable range of the movable contact members (first movable contact member 130, second movable contact member 140), the flexible substrate 70 including contact portions (signal contacts 71*a*, ground contact 71*b*), contact terminals (133, 143) of the movable contact members (first movable contact member 130, second movable contact member 140) being brought into contact with and separated from the contact portions in association with a movement in the longitudinal axis CL direction of the contact terminals (133, 143).

It should be noted that the intermediate knob 30, a middle 40, the distal end knob 50, as well as first springs 110, first balls 111, second springs 120, and second balls 121 serving as detent components illustrated in FIG. 1 are temporarily integrally assembled in a process before incorporation into the switch device 1, and incorporated into the switch device 1 as a subassembly 100.

That is, the subassembly 100 includes the intermediate knob 30 serving as the first knob rotatably fitted to and supported by the middle 40 serving as the fixing portion, the first springs 110 and the first balls 111 for giving a detent feeling upon a rotary movement between the middle 40 serving as the fixing portion and the intermediate knob 30, the distal end knob 50 serving as the second knob rotatably fitted to and supported by the middle 40 serving as the fixing portion, and the second springs 120 and the second balls 121 for giving a detent feeling upon a rotary movement between the middle 40 serving as the fixing portion and the distal end knob 50. In such a subassembly 100, the intermediate knob 30, the first springs 110 and the first balls 111, and the distal end knob 50, the second springs 120 and the second balls 121 are integrally assembled as a subassembly.

Lever Main Body 10

The lever main body 10, which serves as a base member into which each member illustrated in FIG. 1 is incorporated, is formed of a synthetic resin, for example. Each member is formed of a synthetic resin unless otherwise limited in the following. The lever main body 10, as illustrated in FIG. 1, is formed in a lever shape of a base portion 11 into which the rotor members (cam 20, cap 60), the knob members (intermediate knob 30, distal end knob 50), and the like are incorporated; a lever shaft portion 12 disposed on the steering column side and including a rotating central shaft for a lever function, and the like formed therein; and an intermediate portion 13.

The base portion 11 has a substantially cylindrical shape to which the rotor members (cam 20, cap 60) and the knob members (intermediate knob 30, distal end knob 50) are fitted so as to be rotatable about the longitudinal axis CL. The base portion 11 includes a circumferential portion 11*a* that rotatably supports the rotor members (cam 20, cap 60) and the knob members (intermediate knob 30, distal end knob 50) on an outer circumferential portion of the cylindrical shape, and a flat portion 11*b* formed in parallel with the longitudinal axis CL. A space portion 11*c*, which is a hollow portion, housing the flexible substrate 70 is formed inside the cylindrical shape (refer to FIG. 5). Further, a flange portion 11*d* that comes into contact with an end surface of the cam 20 in the longitudinal axis CL direction is formed on the intermediate portion 13 side.

In the space portion 11*c*, a long guide hole 11*e* is formed so as to house the flexible substrate 70 and to allow the signal contacts 71*a* and the ground contact 71*b* of the flexible substrate 70 to be exposed on the first movable contact member 130 and the second movable contact member 140 side. This long guide hole lie is formed at two locations and is capable of supporting the first movable contact member 130 and the second movable contact member 140 so that each is slidable in the longitudinal axis CL direction. Further, to incorporate the first movable contact member 130 and the second movable contact member 140, an incorporation hole 11*f* having a width larger than the width of the long guide hole 11*e* is formed on an end portion of each of the long guide holes 11*e*.

Figure 5:
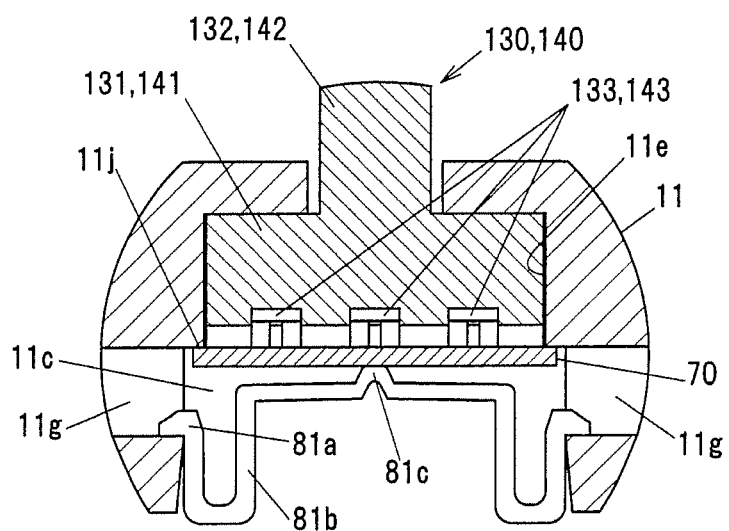
FIG. 5 is a cross-sectional view of the cross-section D-D in FIG. 1, illustrating an assembled state of a lever main body, a movable contact member, a flexible substrate, and a lever cover.
Figure 6:
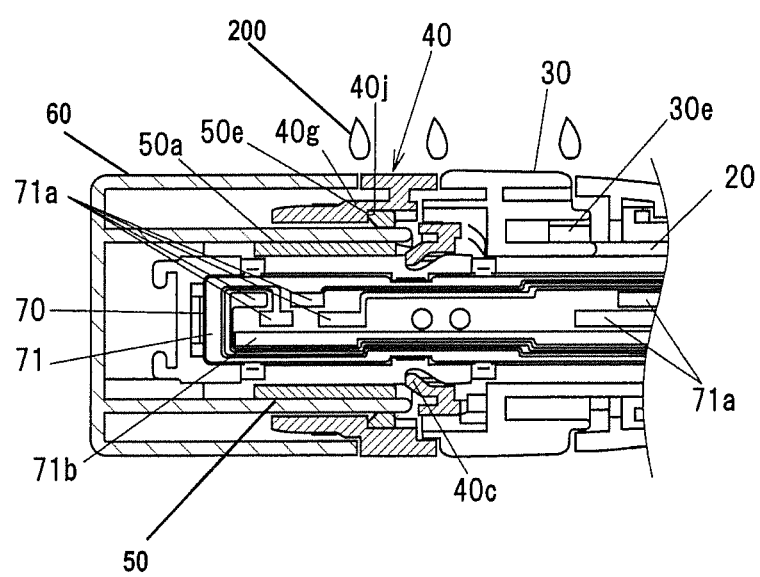
FIG. 6 is a partial cross-sectional view of the switch device according to the embodiment of the present invention mounted to a vehicle, illustrating water droplets dripping from above.

Further, to press and fix the flexible substrate 70 to the base portion 11, a locking hole 11*g* for locking a fixing catch portion 81*a* of a lever cover 80 is formed as illustrated in FIGS. 1 and 5.

Further, a locking hole 11*h* for fixing the middle 40 to the lever main body 10 and mounting a knob structure including the subassembly 100, the cam 20, and the cap 60 to the lever main body 10 is formed as illustrated in FIG. 1.

Cam 20

The cam 20 is equivalent to the rotor member. The cam 20 is formed in a cylindrical shape having an inner circumference portion that rotatably is fitted to the circumferential portion 11*a* of the base portion 11. A cam portion 20*b* is formed on an end surface opposite to an end surface 20*a* that comes into contact with the flange portion 11*d* of the base portion 11. This cam portion 20*b* is formed with an inclined surface that inclines with respect to the longitudinal axis CL. Further, a projection portion 20*c* for fitting and integrating the cam 20 with the intermediate knob 30 is formed at two locations on the cam portion 20*b* side of the cam 20.

Intermediate Knob 30

The intermediate knob 30 is equivalent to the knob member. The intermediate knob 30 is formed in a cylindrical shape, integrated with the cam 20 by a fitting recess portion 30*e* being fitted to the projection portion 20*c* of the cam 20, and rotatably fitted to the circumferential portion 11*a* of the base portion 11 (refer to FIGS. 2A and 2B). An outer circumferential portion 30*a* of the intermediate knob 30 serves as a portion gripped by fingers during a knob operation that causes rotation. A cam portion 30*b* corresponding to the cam portion 20*b* of the cam 20 is formed on the cam 20 side of the intermediate knob 30. With the intermediate knob 30 and the cam 20 fitted together and integrated, a gap between this cam portion 30*b* and the cam portion 20*b* of the cam 20 forms a cam groove having a uniform width. The cam groove is an inclined groove that inclines with respect to the longitudinal axis CL, and this inclined groove is fitted to a drive pin 132 of the first movable contact member 130. The first movable contact member 130, as described later, is guided by the lever main body 10 and movable only in the longitudinal axis CL direction, and therefore is driven in the longitudinal axis CL direction by the rotational operation of the intermediate knob 30.

Bottomed holes 30c that house the first springs 110 are formed inside the intermediate knob 30. Further, walls 30f of these bottomed holes 30c function as a regulating portion for restricting a rotational operation range with respect to the middle 40 (refer to FIGS. 4A and 4B). The first springs 110 allow the first balls 111 to be resiliently in contact with a detent peak portion of the middle 40. Further, a temporary assembly surface 30d that comes into contact with the middle 40 upon assembly of the subassembly 100 is formed on the middle 40 side of the intermediate knob 30 (refer to FIG. 3).

Middle 40

The middle 40 is a fixed member that is fixed to the lever main body 10, supports the intermediate knob 30 or the cap 60 so that either is rotationally operable about the longitudinal axis CL, and that prevents the subassembly 100 from falling off the lever main body 10. The middle 40 is formed in a cylindrical shape, and an outer circumferential portion 40a thereof has substantially the same diameter as those of the intermediate knob 30 and the cap 60 and displays explanations of functions executed by a rotational operation, such as a light symbol mark, AUTO, and the like. An inner circumference portion 40b is fitted to the circumferential portion 11a of the base portion 11, and a fixing catch portion 40c is fitted to and locked by the locking hole 11h of the lever main body 10, thereby fixing the middle 40 to the lever main body 10.

A detent peak portion 40d for giving a detent feeling in association with a rotational operation upon contact by the first balls 111 is formed on the intermediate knob 30 side of the middle 40. Further, a boss portion 40e including a temporary assembly surface 40f that comes into contact with the intermediate knob 30 upon assembly of the subassembly 100 is formed.

Figure 4A:
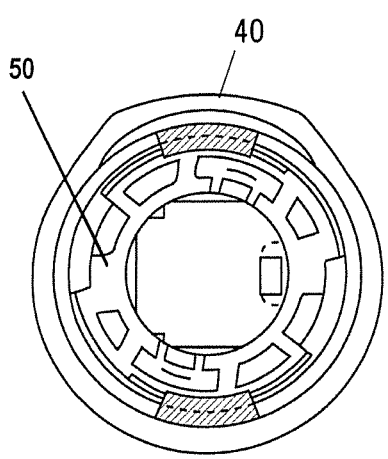
FIG. 4A is a transverse cross-sectional view illustrating the cross section B-B in FIG. 3.
Figure 4B:
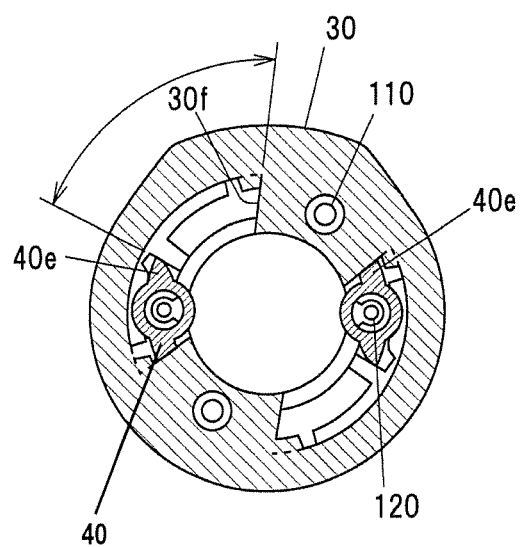
FIG. 4B is a transverse cross-sectional view illustrating the cross section C-C in FIG. 3.

As illustrated in FIG. 4B, the wall 30f of the intermediate knob 30 comes into contact with the boss portion 40e of the middle 40 by the rotational operation of the intermediate knob 30, thereby regulating the rotational operation range of the intermediate knob 30.

A middle stopper 40g for regulating the rotational operation range of the cap 60 is formed protruding on the distal end knob 50 side of the middle 40. Further, bottomed holes 40h that house the second springs 120 are formed inside the middle 40. This allows the second balls 121 to be resiliently in contact with a detent peak portion of the distal end knob 50.

Distal End Knob 50

The distal end knob 50 is equivalent to the knob member. The distal end knob 50 is formed in a cylindrical shape that includes a cylindrical portion 50a and a flange portion 50b so as to be rotatably fitted to the circumferential portion 11a of the base portion 11. A detent peak portion 50c for giving a detent feeling in association with a rotational operation upon contact by the second balls 121 is formed on the middle 40 side of the distal end knob 50.

The flange portion 50b includes a portion formed as a notched portion 50d, and this notched portion 50d has a width significantly larger than the width of the middle stopper 40g. This makes it possible to pass the middle stopper 40g through the notched portion 50d of the flange portion 50b, insert the distal end knob 50 into the middle 40, and rotate the distal end knob 50 causing a sliding surface 50e to come into contact with a sliding surface 40j formed on a lower portion of the middle stopper 40g illustrated in FIGS. 2A and 2B.

A cam portion 50f is formed on the cap 60 side of the distal end knob 50. This cam portion 50f is formed with an inclined surface that inclines with respect to the longitudinal axis CL. Further, a locking catch portion 50g for integrally fixing the distal end knob 50 with the cap 60 is formed at two locations, and a groove portion 50h for fixing the distal end knob 50 so as to prevent relative rotation with the cap 60 is formed at two locations (refer to FIG. 2B).

Cap 60

The cap 60 is equivalent to the rotor member. The cap 60 is formed in a bottomed cylindrical cap shape, fitted to the cylindrical portion 50a of the distal end knob 50 to be integrated with the distal end knob 50, and rotatably fitted to the circumferential portion 11a of the base portion 11. A fitting hole 60b is formed on a distal end portion of a projection portion 60a formed protruding from the inside of the cap 60, and engages with the locking catch portion 50g of the distal end knob 50, thereby fixing the cap 60 to the distal end knob 50.

A cam portion 60c corresponding to the cam portion 50f of the distal end knob 50 is formed on the distal end knob 50 side of the cap 60. With the cap 60 and the distal end knob 50 integrated, a gap between this cam portion 60c and the cam portion 50f of the distal end knob 50 forms a cam groove having a uniform width. The cam groove is an inclined groove that inclines with respect to the longitudinal axis CL, and this inclined groove is fitted to a drive pin 142 of the second movable contact member 140. The second movable contact member 140, as described later, is guided by the lever main body 10 and movable only in the longitudinal axis CL direction, and therefore is driven in the longitudinal axis CL direction by the rotational operation of the cap 60.

Figure 2B:
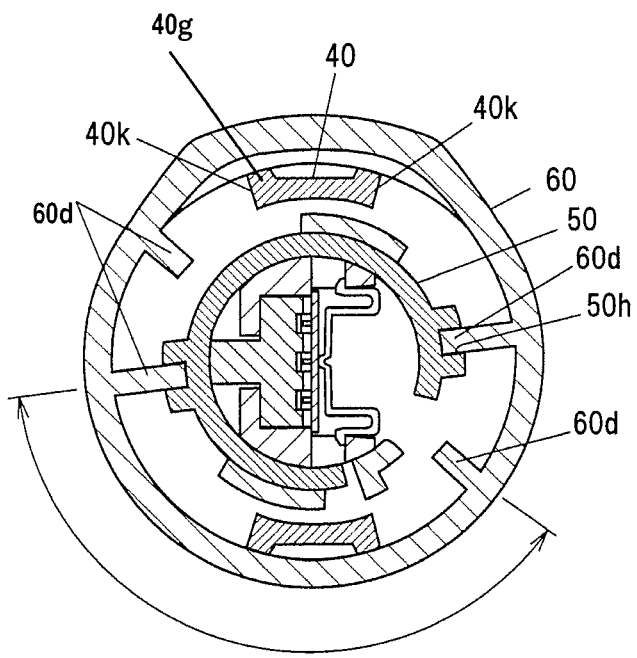
FIG. 2B is a transverse cross-sectional view illustrating the cross section A-A in FIG. 2A.

A cap stopper 60d is formed in the cylindrical interior of the cap 60, as illustrated in FIG. 2B. This cap stopper 60d is fitted to the groove portion 50h of the distal end knob 50, thereby integrally fixing the distal end knob 50 and the cap 60. Further, the cap stopper 60d comes into contact with a middle stopper surface 40k serving as an end portion of the middle stopper 40g by the rotational operation of the cap 60, thereby regulating the rotational operation range of the cap 60.

Flexible Substrate 70

The flexible substrate 70 includes a film substrate 71 and a rigid substrate 72. The film substrate 71 is obtained by forming a conductor foil of copper or the like formed in a predetermined circuit pattern on a base insulator of a film of polyimide or the like. Further, the rigid substrate 72 is a rigid substrate such as a glass epoxy substrate.

The film substrate 71 is lined with the rigid substrate 72 on a back side of the film substrate, in the movable range of the movable contact members (first movable contact member 130, second movable contact member 140). On the other hand, the flexible substrate 70 on the intermediate portion 13 and lever shaft portion 12 side of the lever main body 10 is only formed of a film substrate 71 that is not lined with the rigid substrate 77, making it possible to bend and route the flexible substrate 70 in accordance with the shape of the lever main body 10.

The signal contacts 71a and the ground contact 71b (common contact) are formed on the front side of the film substrate 71 so as to come into contact with the contact terminals (133, 143) of the movable contact members. Further, a pattern is exposed on each of the contacts so that the contacts can electrically come into contact with the contact terminals (133, 143). Other patterns and wiring portions, insulated by a coverlay, form patterns up to a connector end portion 71c.

While a portion of the film substrate 71 of the flexible substrate 70 is disposed in the base portion 11 of the lever main body 10, the portion of the film substrate 70, which is disposed in the base portion 11, is lined with the rigid substrate 72, thereby causing the flexible substrate 70 to be linearly disposed, without bending, in the longitudinal axis CL direction in at least the movable range of the movable contact members (first movable contact member 130, second movable contact member 140).

As illustrated in FIG. 2A, the flexible substrate 70 includes a contact structure that becomes conductive or non-conductive by the signal contacts 71a and the ground contact 71b coming into contact with or separating from the contact terminals (133, 143). The ground contact 71b is disposed on the lower side of the lever main body 10. The contact terminals (133, 143) electrically come into contact with the signal contacts 71a or the ground contact 71b (common terminal), making it possible to control the turning on and off of lights and the like in accordance with the contact combination.

Lever Cover 80

The lever cover 80 is inserted into the space portion 11c in a direction of the arrow in FIG. 1 and mounted to the lever main body 10, thereby fixing the flexible substrate 70. Further, the lever cover 80 presses the film substrate 71 along the intermediate portion 13 and the lever shaft portion 12 of the lever main body 10 (refer to FIGS. 1 and 5). The lever cover 80 includes a main portion 81 that is inserted into the space portion 11c of the lever main body 10 and mounted to the lever main body 10, and a bending portion 82 that bends on the intermediate portion 13 side.

As illustrated in FIG. 5, the flexible substrate 70 (film substrate 71 and rigid substrate 72) is fixed by the lever cover 80 while pressed against a contacting portion 11j of the space portion 11c of the lever main body 10.

The main portion 81 of the lever cover 80 includes the catch portion 81a, a curved portion 81b, and a projection portion 81c for pressing the flexible substrate 70 against the contacting portion 11j, as illustrated in the cross-sectional view of FIG. 5. The lever cover 80 is formed of a synthetic resin, and thus can elastically bend mainly at the curved portion 81b. As a result, the catch portion 51a is fitted to and locked by the locking hole 11g of the lever main body 10 with the flexible substrate 70 pressed against the contacting portion 11j by the projection portion 81c.

It should be noted that the projection portion 81c, as illustrated in FIG. 5, presses a substantially central portion of the substantially flexible substrate 70, and is formed at a plurality of locations in the longitudinal axis CL direction, causing the flexible substrate 70 to press against the contacting portion 11j along a sliding direction of the movable contact members (first movable contact member 130, second movable contact member 140) as illustrated in FIG. 1. This makes it possible to support the flexible substrate so that the flexible substrate is linearly disposed in the longitudinal axis CL direction in the movable range of the movable contact members.

Upper cover 90 and Lower Cover 91

An upper cover 90 and a lower cover 91 sandwich and cover the lever main body 10, the flexible substrate 70, the lever cover 80, and the like in an assembled state, in the direction of the arrow illustrated in FIG. 1. The upper cover 90 and the lower cover 91 are formed of a synthetic resin and are made to cover the lever main body 10 and the like at an end of an assembly process, functioning as cover members as well as design components.

First Movable Contact Member 130 and Second Movable Contact Member 140

The first movable contact member 130 and the second movable contact member 140, which serve as movable contact members, include movable bodies 131, 141, the chive pins 132, 142 formed protruding from the movable bodies, and the contact terminals 133, 143 that come into contact with the contact portions (signal contacts 71a, ground contact 71b), as illustrated in FIGS. 1 and 5. The first movable contact member 130 and the second movable contact member 140 are integrally formed with the contact terminals 133, 143 by insert molding using a synthetic resin, respectively.

It should be noted that materials used for the contact terminals 133, 143 include copper, phosphor bronze, beryllium copper, and the like.

The movable bodies 131, 141, as illustrated in FIG. 5, are housed in the long guide holes 11e of the base portion 11, and are movable while sliding in the longitudinal axis CL direction. The drive pins 132, 142 that protrude from the movable bodies 131, 141 are respectively inserted into the cam groove formed by fitting and integrating the cam 20 with the intermediate knob 30, and the cam groove formed by integrating the distal end knob 50 with the cap 60.

As described above, these cam grooves are inclined grooves that incline with respect to the longitudinal axis CL, and thus a driving force in the longitudinal axis CL direction acts on the drive pins 132, 142 and the movable bodies 131, 141 by the rotational operation of the rotor members (cam 20, cap 60) or the knob members (intermediate knob 30, distal end knob 50) about the longitudinal axis CL. As a result, the contact terminals 133, 143 can move in the longitudinal axis CL direction while in contact with the surface of the film substrate 71 of the flexible substrate 70. That is, it is possible to control the turning on and off of lights and the like in accordance with the combination of contact between the signal contacts 71a or the ground contact 71b (common contact) and the contact terminals (133, 143) resulting from the rotational operation of the rotor members (cam 20, cap 60) or the knob members (intermediate knob 30, distal end knob 50) about the longitudinal axis CL.

Subassembly 100

Figure 3:
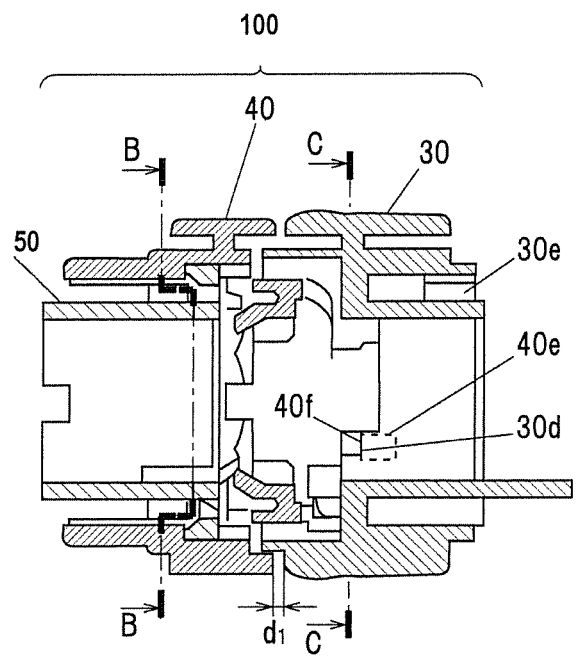
FIG. 3 is a longitudinal cross-sectional view of a subassembled state of a distal end knob, a middle, an intermediate knob, and detent components of the switch device according to the embodiment of the present invention.

The subassembly 100 illustrated in FIGS. 1 and 3 is obtained by temporarily integrally assembling the intermediate knob 30, the middle 40, the distal end knob 50, as well as the first springs 110, the first balls 111, the second springs 120, and the second balls 121 serving as detent components in a process before incorporation into the switch device 1.

The first springs 110 are housed in the respective bottomed holes 30c of the intermediate knob 30. The intermediate knob 30 serving as the first knob is incorporated into the middle 40 serving as the fixing portion with the first balls 111 disposed in the distal end portion of the first springs 110.

A boss portion 40e of the middle 40 is inserted into the intermediate knob 30 side and rotated, causing the temporary assembly surface 30d of the intermediate knob 30 and the temporary assembly surface 40f of the middle 40 to come into contact, as illustrated in FIGS. 3 and 4B. In this state, the resilient force of the first springs 110 causes the temporary assembly surface 40f and the temporary assembly surface 30d to come into contact with a constant spring force.

Further, the first balls 111 come into contact with the detent peak portion 40d of the middle 40 with the spring force described above.

This causes a detent feeling (click feeling) to be felt when the intermediate knob 30 is rotationally operated. It should be noted that grease is applied to the first balls 111 and the detent peak portion 40d.

In this temporarily assembled state, a gap between the intermediate knob 30 and the middle 40 is $d_1$, as illustrated in FIG. 3.

Next, the distal end knob 50 serving as the second knob is incorporated into the middle 40 serving as the fixing portion. The second springs 120 are housed in the respective bottomed holes 40h of the middle 40. The distal end knob 50 is incorporated in the middle 40 with the second balls 121 disposed in the distal end portions of the second springs 120. The middle stopper 40g of the middle 40 is passed through the notched portion 50d of the flange portion 50b of the distal end knob 50, and the distal end knob 50 is inserted into the middle 40 and rotated, causing the sliding surface 40j formed on the lower portion of the middle stopper 40g illustrated in FIGS. 2A and 2B to come into contact with the sliding surface 50e of the distal end knob 50. In this state, the resilient force of the second springs 120 causes the sliding surface 40j of the middle 40 and the sliding surface 50e of the distal end knob 50 to come into contact with a constant spring force. This contacting surface serves as a sliding surface upon the rotational operation of the cap 60 (distal end knob 50) after assembly of the switch device 1.

Further, the second balls 121 come into contact with the detent peak portion 50c of the distal end knob 50 with the spring force described above. This causes a detent feeling (click feeling) to be felt when the cap 60 (distal end knob 50) is rotationally operated. It should be noted that grease is applied to the second balls 121 and the detent peak portion 50c.

As described above, the intermediate knob 30, the middle 40, the distal end knob 50, as well as the first springs 110, the first balls 111, the second springs 120, and the second balls 121 serving as detent components are temporarily integrally assembled in a process before incorporation into the switch device 1. This makes it possible to perform assembly in one direction of the longitudinal axis CL of the lever main body 10 in the assembly process of the switch device 1.

Further, grease is collectively applied to locations that come into contact with the first balls 111 and the second balls 121, and then subassembly is performed. This makes it possible to collectively apply grease to the first springs 110, the first balls 111, the second springs 120, and the second balls 121 serving as the detent components, simplify the grease application process, and shorten the work process.

Assembly of Switch Device 1

The following describes the assembly of the switch device 1 on the basis of FIG. 1.

First, the flexible substrate 70 is fixed to the base portion 11 of the lever main body 10. The flexible substrate 70 is inserted into the space portion 11c of the base portion 11, and then the main portion 81 of the lever cover 80 is pressed in, thereby causing the catch portion 81a to be fitted to and locked by the locking hole 11g and the flexible substrate and the lever cover 80 to be fixed. As a result, the flexible substrate is linearly disposed in the longitudinal axis CL direction in the movable range of the movable contact members.

Next, the cam 20 is incorporated into the base portion 11 of the lever main body 10.

The cam 20 is inserted until being in contact with the flange portion 11d of the base portion 11.

The first movable contact member 130 is passed through the incorporation hole 11f of the base portion 11 and inserted into the long guide hole 11e.

The subassembly 100 is inserted into the base portion 11 of the lever main body 10 and pressed until being fitted to the cam 20. As a result, the fixing catch portion 40c of the middle 40 is fitted to and locked by the locking hole 11h of the lever main body 10, thereby fixing the middle 40 to the lever main body 10. That is, the subassembly 100 is assembled in a temporarily assembled state, and mounted to the base portion 11 of the lever main body 10.

With the subassembly 100 incorporated into the base portion 11, a distance from an end surface of the flange portion 11d to an end surface of the fixing catch portion 40c is a predetermined value do, as illustrated in FIGS. 2A and 2B. At this time, the first springs 110 are slightly compressed, causing the gap $d_1$ between the intermediate knob 30 and the middle 40 in a temporarily assembled state to become a setting value $d_{01}$ in the fully assembled state (refer to FIGS. 2A, 2B, and 3). The setting value $d_{01}$ after this assembly is less than the gap $d_1$ in the temporary assembled state. The setting value $d_{01}$ after assembly is set to, for example, 0.3 mm. Further, the state of contact between the temporary assembly surface 40f of the middle 40 and the temporary assembly surface 30d of the intermediate knob 30 upon temporary assembly is released, forming a gap between the temporary assembly surface 40f and the temporary assembly surface 30d. This makes the intermediate knob 30 (cam 20) smoothly rotationally operable around the circumferential portion 11a of the base portion 11.

Next, the second movable contact member 140 is passed through the incorporation hole 11f of the base portion 11 and inserted into the long guide hole 11e.

The cap 60 is inserted into the base portion 11 of the lever main body 10, and the cap 60 is fitted and fixed to the distal end knob 50. This makes the cap 60 (distal end knob 50) smoothly rotationally operable around the circumferential portion 11a of the base portion 11 while the sliding surface 40j of the middle 40 is in contact with the sliding surface 50e of the distal end knob 50.

Lastly, the upper cover 90 and the lower cover 91 sandwich and fix the lever main body 10 assembled as described above. With this, the assembly process of the switch device 1 is completed.

In the assembly process described above, the portion of the flexible substrate 70 that is lined with the rigid substrate 72 is assembled to the base portion 11 of the lever main body 10, making a bending process unnecessary and allowing the flexible substrate 70 to be easily linearly disposed in the longitudinal axis CL direction in the movable range of the movable contact members (first movable contact member 130, second movable contact member 140). The other processes are also processes in which the members are simply sequentially disposed, thereby making automatic assembly possible. It should be noted that the upper cover 90 and the lower cover 91 are design components, and therefore may be assembled in a separate process after automatic assembly.

Effect of Embodiment(s) of Present Invention

According to the embodiment of the present invention, the intermediate knob 30, the middle 40, the distal end knob 50, as well as the first springs 110, the first balls 111, the second springs 120, and the second balls 121 serving as detent components are temporarily integrally assembled in a process before incorporation into the switch device 1, and incorporated into the switch device 1 as the subassembly 100. As a result, it is possible to perform subassembly with grease collectively applied to locations that come into contact with the first balls 111 and the second balls 121, which serve as detent components. That is, it is possible to collectively apply grease to the first springs 110, the first balls 111, the second springs 120, and the second balls 121 serving as the detent components, which simplifies the grease application process, and shortens the work process. Furthermore, it is possible to improve the efficiency of the manufacturing line.

Although embodiments of the present invention have been described above, these embodiments are merely examples and the invention according to claims is not to be limited thereto. Novel embodiments and modifications thereof may be implemented in various other forms, and various omissions, substitutions, changes, and the like can be made without departing from the spirit and scope of the present invention. In addition, all combinations of the features described in these embodiments are not necessary to solve the problem of the invention. Further, these embodiments and modifications are included within the spirit and scope of the invention and also within the invention described in the claims and the scope of equivalents thereof.

REFERENCE SIGNS LIST

1 Switch device
10 Lever main body
11 Base portion
11a Circumferential portion
11b Flat portion
11c Space portion
11d Flange portion
11e Long guide hole
11f Incorporation hole
11g Locking hole
11h Locking hole
11j Contacting portion
12 Lever shaft portion
13 Intermediate portion
20 Cam (rotor member)
20a End surface
20b Cain portion
20c Projection portion
30 Intermediate knob (knob member)
30a Outer circumferential portion
30b Cam portion
30c Bottomed hole
30d Temporary assembly surface
30e Fitting recess portion
30f Wall
40 Middle
40a Outer circumferential portion
40b Inner circumferential portion
40c Fixing catch portion
40d Detent peak portion
40e Boss portion
40f Temporary assembly surface
40g Middle stopper
40h Bottomed hole
40j Sliding surface
40k Middle stopper surface
50 Distal end knob (knob member)
50a Cylindrical portion
50b Flange portion
50c Detent peak portion
50d Notched portion
50e Sliding surface
50f Cam portion
50g Locking catch portion
50h Groove portion
60 Cap (rotor member)
60a Projection portion
60b Fitting hole
60c Cam portion
60d Cap stopper
70 Flexible substrate
71 Film substrate
71a Signal contact
71b Ground contact
71c Connector end portion
72 Rigid substrate
80 Lever cover
81 Main portion
81a Catch portion
81b Curved portion
81c Projection portion
82 Bending portion
90 Upper cover
91 Lower cover
100 Subassembly
110 First spring
111 First ball
120 Second spring
121 Second ball
130 First movable contact member
131, 141 Movable body
132, 142 Drive pin
133, 143 Contact terminal
140 Second movable contact member
200 Water droplet
CL Longitudinal axis

What is claimed is:

1. A switch device comprising:
a first knob rotatably fitted to and supported by a fixing portion;
a first spring and a first ball for giving a detent feeling upon a rotary movement between the fixing portion and the first knob;
a second knob rotatably fitted to and supported by the fixing portion;
a second spring and a second ball for giving a detent feeling upon a rotary movement between the fixing portion and the second knob;
a lever main body comprising a base portion provided with a movable contact member and a support shaft having a circumferential portion for receiving and rotatably supporting the first and second knob members, and
first and second connecting mechanisms for axially interconnecting the first knob and the fixing portion, and the second knob and the fixing portion, respectively, without support from the support shaft, such that the first knob, the first spring and the first ball, and the second knob, the second spring and the second ball are integrally assembled and connected along an axis of rotation as a subassembly by the fixing portion prior to the subassembly being received by and rotatably supported by the support shaft, wherein the first and second connecting mechanisms each include interlocking members that interfere with one another along the axis of rotation.

2. The device according to claim 1, wherein the subassembly is assembled into the switch device in a temporarily assembled state.

3. The device according to claim 1, wherein grease is collectively applied to locations that come into contact with the first ball and the second ball.

4. The device according to claim 1, wherein the first knob and the second knob face each other across the fixing portion.

5. The device according to claim 1, wherein the fixing portion comprises engaging portions with the first knob and the second knob, respectively.

6. A switch device comprising:
   a first knob rotatably fitted to and supported by a fixing portion;
   a first spring and a first ball for giving a detent feeling upon a rotary movement between the fixing portion and the first knob;
   a second knob rotatably fitted to and supported by the fixing portion;
   a second spring and a second ball for giving a detent feeling upon a rotary movement between the fixing portion and the second knob,
   a lever main body including a base portion provided with a support shaft having a circumferential portion for receiving and rotatably supporting the first and second knob members, and the fixing portion, and
   first and second connecting mechanisms for axially interconnecting the first and second knobs to the fixing portion without support from the support shaft of the lever main body such that the first knob, the first spring and the first ball, and the second knob, the second spring and the second ball and fixing portion are integrally connected along an axis of rotation as a subassembly independently of the lever main body prior to the subassembly being received by and rotatably supported by the support shaft,
   wherein the first and second connecting mechanisms each include interlocking members that interfere with one another along the axis of rotation.

7. A method of assembling a switch device comprising a first knob rotatably fitted to and supported by a fixing portion; a first spring and a first ball for giving a detent feeling upon a rotary movement between the fixing portion and the first knob; a second knob rotatably fitted to and supported by the fixing portion; a second spring and a second ball for giving a detent feeling upon a rotary movement between the fixing portion and the second knob, a lever main body including a base portion provided with a support shaft having a circumferential portion for receiving and rotatably supporting the first and second knob members, and the fixing portion, and first and second connecting mechanisms for axially interconnecting the first and second knobs to the fixing portion without support from the support shaft of the lever main body, comprising the sequential steps of:
   axially interconnecting the first and second knob members to the fixing portion solely with the first and second connecting mechanisms without support from the main lever body to form an integral sub-assembly, and
   assembling the integral sub-assembly to the support shaft of the lever main body.

* * * * *